US012691725B2

(12) United States Patent
Yun et al.

(10) Patent No.: US 12,691,725 B2
(45) Date of Patent: Jul. 28, 2026

(54) HEAT PUMP SYSTEM FOR A VEHICLE

(71) Applicants: HYUNDAI MOTOR COMPANY, Seoul (KR); KIA CORPORATION, Seoul (KR)

(72) Inventors: Hyeonkeun Yun, Hwaseong-si (KR); Yong Woong Cha, Yongin-si (KR); DaeKyu Han, Seoul (KR); Hyo Chan Bae, Hwaseong-si (KR); Seong-Bin Jeong, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 120 days.

(21) Appl. No.: 18/673,915

(22) Filed: May 24, 2024

(65) Prior Publication Data

US 2025/0178410 A1 Jun. 5, 2025

(30) Foreign Application Priority Data

Dec. 4, 2023 (KR) ........................ 10-2023-0173189

(51) Int. Cl.
*B60H 1/00* (2006.01)

(52) U.S. Cl.
CPC ..... *B60H 1/00899* (2013.01); *B60H 1/00278* (2013.01)

(58) Field of Classification Search
CPC ...... B60H 1/00278; B60H 2001/00307; B60H 1/00885
See application file for complete search history.

(56) References Cited

U.S. PATENT DOCUMENTS

| | | | | |
|---|---|---|---|---|
| 11,505,038 B2 * | 11/2022 | Kim | .................... | B60H 1/00899 |
| 11,529,844 B2 * | 12/2022 | Kim | .................... | B60H 1/00921 |
| 11,870,045 B2 * | 1/2024 | Kim | .................... | H01M 10/6569 |
| 12,344,070 B2 * | 7/2025 | Hong | .................. | F16K 11/0856 |
| 12,403,746 B2 * | 9/2025 | Nilsson | .............. | B60H 1/00642 |
| 12,441,159 B2 * | 10/2025 | Tiemeyer | ........... | B60H 1/00278 |
| 2016/0031288 A1 * | 2/2016 | Nishikawa | .............. | B60L 58/26 |
| | | | | 165/43 |
| 2020/0049151 A1 * | 2/2020 | Kang | .................... | F04D 29/605 |
| 2021/0402844 A1 * | 12/2021 | Kim | .................... | B60H 1/00392 |
| 2022/0001717 A1 * | 1/2022 | Kim | .................... | B60H 1/00921 |
| 2022/0016955 A1 * | 1/2022 | Kim | .................... | B60H 1/00278 |
| 2022/0032736 A1 * | 2/2022 | Kim | .................... | B60H 1/3205 |
| 2022/0163132 A1 * | 5/2022 | Jeong | ................ | B60H 1/00921 |
| 2022/0281285 A1 * | 9/2022 | Kim | .................... | B60H 1/00278 |
| 2023/0173881 A1 * | 6/2023 | Jeong | ................ | B60H 1/00785 |
| 2023/0358325 A1 * | 11/2023 | Chen | .................. | B60H 1/32284 |
| 2023/0406065 A1 * | 12/2023 | Malone | ............. | B60H 1/00485 |

(Continued)

*Primary Examiner* — Nelson J Nieves
(74) *Attorney, Agent, or Firm* — Lempia Summerfield Katz LLC

(57) ABSTRACT

A heat pump system for a vehicle may be capable of improving the overall efficiency of the system as well as simplifying the system. This may be achieved by adjusting the temperature of a battery module using a single chiller where the refrigerant and the coolant exchange heat, and by recollecting waste heat of the electrical components and the battery module and using it for heating the vehicle. Additionally, the overall efficiency of the system may be achieved by forming a plurality of coolant flowing lines by a single valve according to a selected mode of the vehicle.

16 Claims, 6 Drawing Sheets

(56)                    References Cited

U.S. PATENT DOCUMENTS

| | | | | |
|---|---|---|---|---|
| 2024/0110630 A1* | 4/2024 | Tiemeyer | ............ | H01M 10/613 |
| 2024/0133471 A1* | 4/2024 | Hong | ................ | B60H 1/00278 |
| 2024/0140162 A1* | 5/2024 | Tiemeyer | ................ | F25B 41/42 |
| 2024/0190202 A1* | 6/2024 | Jeong | ................ | B60H 1/00278 |
| 2024/0246396 A1* | 7/2024 | Jeong | ................ | B60H 1/00392 |
| 2024/0300286 A1* | 9/2024 | Suzuki | ................ | H01M 10/663 |
| 2024/0300291 A1* | 9/2024 | Suzuki | ................ | H01M 10/613 |
| 2024/0300300 A1* | 9/2024 | Yuan | ...................... | B60K 11/04 |
| 2024/0300332 A1* | 9/2024 | Suzuki | .............. | B60H 1/00485 |
| 2024/0408934 A1* | 12/2024 | Kuepper | ........... | B60H 1/00278 |
| 2024/0410476 A1* | 12/2024 | Suzuki | .............. | B60H 1/32284 |
| 2025/0018767 A1* | 1/2025 | Jeong | ................ | B60H 1/32284 |
| 2025/0018786 A1* | 1/2025 | Tiemeyer | ............ | H01M 10/613 |
| 2025/0031345 A1* | 1/2025 | Chae | .................. | H05K 7/20927 |
| 2025/0144978 A1* | 5/2025 | Jeong | ................ | B60H 1/00885 |
| 2025/0153539 A1* | 5/2025 | Jeong | ................ | B60H 1/32284 |
| 2025/0319737 A1* | 10/2025 | Cha | ........................ | B60H 1/143 |

* cited by examiner

HEAT PUMP SYSTEM FOR A VEHICLE

CROSS-REFERENCE TO RELATED APPLICATION

This application claims priority to and the benefit of Korean Patent Application No. 10-2023-0173189 filed in the Korean Intellectual Property Office on Dec. 4, 2023, the entire contents of which are incorporated herein by reference.

BACKGROUND

(a) Field of the Disclosure

The present disclosure relates to a heat pump system for a vehicle. More particularly, the present disclosure relates to a heat pump system for a vehicle capable of adjusting the temperature of a battery module.

(b) Description of the Related Art

Generally, an air conditioning system for a vehicle includes an air conditioner unit circulating a refrigerant in order to heat or cool an interior of the vehicle.

The air conditioner unit, which is used to maintain the interior of the vehicle at an appropriate temperature regardless of a change in an external temperature, is configured to heat or cool the interior of the vehicle. This is achieved by heat-exchange using a condenser and an evaporator in a process in which a refrigerant discharged by driving a compressor is circulated back to the compressor through the condenser, a receiver drier, an expansion valve, and the evaporator.

In other words, the air conditioner unit lowers the temperature and humidity of the interior of the vehicle by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Recently, in accordance with a continuous increased interest in energy efficiency and environmental pollution, the development of an environmentally-friendly vehicle capable of substantially substituting for an internal combustion engine vehicle is desired. The environmentally-friendly vehicles are classified into electric vehicles driven using a fuel cell or electricity as a power source and hybrid vehicles driven using an engine and a battery.

Among these environmentally-friendly vehicles, a separate heater is not used unlike an air conditioner of a general vehicle. Additionally, an air conditioner used in the environmentally-friendly vehicle is generally called a heat pump system.

The electric vehicle driven by the power source of the fuel cell generates driving force by converting chemical reaction energy between oxygen and hydrogen into electrical energy. In this process, heat energy is generated by a chemical reaction in a fuel cell. Therefore, it is advantageous to secure performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, a cooling means, a heat pump system, and a battery cooling system, respectively, should be configured as separate closed circuits so as to prevent heat generation of the motor, an electric component, and the battery including a fuel cell.

Therefore, the size and weight of a cooling module disposed at the front of the vehicle are increased. Also, a layout of connection pipes supplying a refrigerant and a coolant to each of the heat pump system, the cooling means, and the battery cooling system in an engine compartment becomes complicated.

In addition, since a battery cooling system for heating or cooling the battery according to a state of the vehicle is separately provided to obtain optimal performance of the battery, a plurality of valves for selectively interconnecting connections pipes are employed Thus, noise and vibration due to frequent opening and closing operations of the valves may be introduced into the vehicle interior, thereby deteriorating the ride comfort.

In addition, when heating the vehicle interior, the heating performance may deteriorate due to the lack of a heat source, the electricity consumption may be increased due to the usage of the electric heater, and the power consumption of the compressor may be increased.

In addition, a separate heat-exchanger is additionally required in order to recollect waste heat from various heat sources in the heating mode of the vehicle, which results in the disadvantage of increasing manufacturing costs.

The above information disclosed in this Background section is only to enhance understanding of the background of the disclosure. Therefore, the Background section may contain information that does not form the prior art that is already known to a person of ordinary skill in the art.

SUMMARY

The present disclosure provides a heat pump system for a vehicle that is capable of enhancing the overall efficiency of the system by adjusting a temperature of a battery module using a single chiller where a refrigerant and a coolant exchange heat, and by selectively recollecting waste heat of the electrical component and the battery module and using the same for heating of the vehicle interior.

In addition, the present disclosure provides a heat pump system for a vehicle that is capable of simplifying a layout of the system and reducing manufacturing costs by forming a plurality of coolant lines with coolant flow controlled by a single valve according to a selected mode of the vehicle.

A heat pump system for a vehicle may include a valve module configured to control flow of a coolant that is interiorly introduced based on at least one mode for a temperature adjustment of a vehicle interior and a temperature adjustment of a battery module. The system may include a first line connected to the valve module to selectively flow the coolant, and provided with an electrical component and may include a second line having a first end connected to the first line and a second end connected to the valve module to selectively flow the coolant, and provided with a first radiator The system may also include a third line connected to the valve module to selectively flow the coolant, and provided with the battery module and may include a fourth line having a first end connected to the valve module to selectively flow the coolant, and a second end connected to the third line. The system may also include a fifth line having a first end connected to the valve module to selectively flow the coolant and having a second end provided with a chiller. The system may also include a sixth line having a first end connected to the first line at a location where the first line and the second line are connected and configured to selectively flow the coolant. The system may also include a seventh line having a first end connected to the third line at a location where the third line and the fourth line are connected and having a second end connected to the chiller to selectively flow the coolant. The system may also include an eighth line having a first end connected to the chiller to selectively flow the coolant and having a second end connected to a second end of the sixth line. The system may also include a ninth line having a first end connected to the valve module to selectively flow the coolant and having a second end connected to the eighth line at a location where the sixth line and the eighth line are connected, and provided with a second radiator.

The valve module may include a valve configured to control flow of the interiorly introduced coolant, and at least one water pump provided in the valve.

The at least one water pump may include a first water pump mounted on the valve to correspond to the first line and may include a second water pump mounted on the valve to correspond to the third line.

The first water pump and the second water pump may be disposed at locations facing each other with respect to the valve.

The valve may be configured to selectively discharge the coolant selectively introduced from the second line, the fourth line, the fifth line, or the ninth line, via the first line or the third line, based on a selected mode among the at least one mode.

The at least one mode may include: a first mode for cooling the electrical component by using the coolant cooled at the first radiator and cooling the battery module by using the coolant cooled at the second radiator; a second mode for cooling the electrical component by using the coolant cooled at the first radiator and cooling the battery module by using the coolant cooled at the chiller; a third mode for heating the vehicle interior and recollecting the waste heat of the electrical component; a fourth mode for heating the vehicle interior and recollecting the waste heat of the battery module; and/or a fifth mode for heating the vehicle interior and heating the battery module while recollecting the waste heat of the electrical component.

In the first mode, the first line may be connected to the second line by an operation of the valve module such that the coolant cooled by the first radiator may be supplied to the electrical component. The ninth line may be connected to the third line by the operation of the valve module such that the coolant cooled by the second radiator may be supplied to the battery module. The fourth line and the fifth line may be closed by the operation of the valve module. The sixth line may be closed. The seventh line may be opened to be connected to the third line and the chiller. The eighth line may be opened to be connected to the ninth line and the chiller. The seventh line and the eighth line may be interconnected through the chiller. The first line and the second line may be interconnected by the operation of the valve module to form an independent closed circuit such that the coolant cooled by the first radiator may circulate along the first line and the second line. The third line, the seventh line, the eighth line, and the ninth line may be interconnected by the operation of the valve module to form an independent closed circuit such that the coolant cooled by the second radiator may circulate along the third line, the seventh line, the eighth line, and the ninth line.

In the second mode, the first line may be connected to the second line by an operation of the valve module such that the coolant cooled by the first radiator may be supplied to the electrical component. The fifth line may be connected to the third line by the operation of the valve module. The seventh line may be opened to be connected to the third line and the chiller. The fourth line and the ninth line may be closed by the operation of the valve module. The sixth line and the eighth line may be closed. The first line and the second line may form an independent closed circuit by the operation of the valve module. The third line, the fifth line, and the seventh line may form an independent closed circuit by the operation of the valve module. The chiller may be configured to cool the coolant through heat-exchange with a refrigerant such that the cooled coolant may be supplied to the battery module.

In the third mode, the second line may be closed by an operation of the valve module such that the coolant having passed through the electrical component may not be supplied to the first radiator. The third line, the fourth line, and the ninth line may be closed by the operation of the valve module. The fifth line may be connected to the first line by the operation of the valve module. The sixth line may be opened to be connected to the first line. The seventh line may be closed. The eighth line may be opened to connect the sixth line and the chiller. The first line, the fifth line, the sixth line, and the eighth line may form an independent closed circuit by the operation of the valve module. The chiller may be configured to recollect the waste heat of the electrical component from the coolant whose temperature is increased while cooling the electrical component.

In the fourth mode, the first line, the second line, the fourth line, and the ninth line may be closed by an operation of the valve module. The fifth line may be connected to the third line by the operation of the valve module. The seventh line may be opened to be connected to the third line and the chiller. The sixth line and the eighth line may be closed. The third line, the fifth line, and the seventh line may form an independent closed circuit by the operation of the valve module. The chiller may be configured to recollect the waste heat of the battery module from the coolant whose temperature is increased while cooling the battery module.

In the fifth mode, the second line may be closed by an operation of the valve module such that the coolant having passed through the electrical component may not be supplied to the first radiator. The fourth line may be connected to the third line by the operation of the valve module. The fifth line may be connected to the first line by the operation of the valve module. The sixth line may be opened to be connected to the first line. The seventh line may be closed. The eighth line may be opened to connect the sixth line and the chiller. The ninth line may be closed by the operation of the valve module. The first line, the fifth line, the sixth line, and the eighth line may form an independent closed circuit by the operation of the valve module. The third line and the fourth line may form an independent closed circuit by the operation of the valve module. The chiller may be configured to recollect the waste heat of the electrical component from the coolant whose temperature is increased while cooling the electrical component. The battery module may be selectively heated by using the coolant flowing along the third line and the fourth line.

The valve module may further include a first reservoir tank provided in the valve and connected to the second line, and a second reservoir tank provided in the valve and connected to the ninth line.

The chiller may be connected to an air conditioner unit via a refrigerant connection line.

The chiller may be a water-cooled heat-exchanger configured to exchange heat between the interiorly introduced coolant and a refrigerant supplied from the air conditioner unit.

A coolant heater may be provided on the third line.

For increasing a temperature of the battery module, the coolant heater may be operated to heat the coolant supplied to the battery module along the third line.

According to a heat pump system for a vehicle according to an embodiment, the overall efficiency of the system may be enhanced by adjusting a temperature of a battery module using a single chiller where a refrigerant and a coolant exchange heat, and by selectively recollecting waste heat of the electrical component and the battery module and using the same for heating of the vehicle.

In addition, according to the present disclosure, the system may be streamlined and simplified while reducing manufacturing costs by forming a plurality of coolant flowing lines by a single valve according to the selected mode of the vehicle.

In addition, according to an embodiment, by efficiently adjusting the temperature of the battery module, the optimal performance of the battery module may be enabled, and the overall travel distance of the vehicle may be increased due to the efficient management of the battery module.

In addition, according to an embodiment, it is possible to reduce manufacturing cost and weight through the simplification of an entire system, and thus improve space utilization.

DETAILED DESCRIPTION

Figure 1:
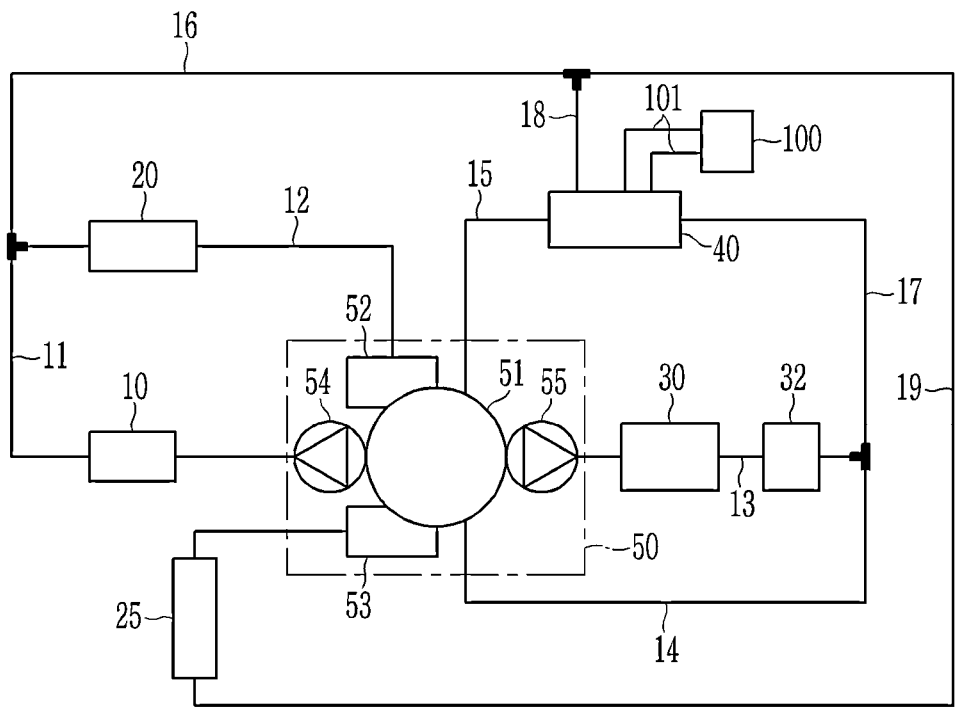
FIG. 1 is a block diagram of a heat pump system for a vehicle according to an embodiment.

Embodiments are hereinafter described in detail with reference to the accompanying drawings.

The embodiments disclosed in the present specification and the constructions depicted in the drawings are only example embodiments of the present disclosure, and do not cover the entire scope of the present disclosure. Therefore, it should be understood that there may be various equivalents and variations at the time of the application of this specification.

In order to clarify the present disclosure, parts that are not related to the description have been omitted. Also, the same elements or equivalents are referred to with the same reference numerals throughout the specification.

Also, the size and thickness of each element are arbitrarily shown in the drawings, but the present disclosure is not necessarily limited thereto. Additionally, in the drawings, the thickness of layers, films, panels, regions, and the like, may be exaggerated for clarity.

In addition, unless explicitly described to the contrary, the terms "comprise" and variations such as "comprises" or "comprising", should be understood to imply the inclusion of stated elements but not the exclusion of any other elements.

Furthermore, terms, such as " . . . unit", " . . . means", " . . . portions", " . . . part", and " . . . member" described in the specification, mean a unit of a comprehensive element that performs at least one function or operation.

When a component, device, element, or the like of the present disclosure is described as having a purpose or performing an operation, function, or the like, the component, device, or element should be considered herein as being "configured to" meet that purpose or perform that operation or function.

FIG. 1 is a block diagram of a heat pump system for a vehicle according to an embodiment.

According to a heat pump system for a vehicle according to an embodiment, a temperature of a battery module 30 may be efficiently adjusted by using one chiller 40 where a refrigerant and a coolant exchange heat, and the waste heat of an electrical component 10 and the battery module 30 may be selectively recollected to be used for heating of a vehicle interior. As a result, the overall efficiency of the system may be improved.

In addition, according to the heat pump system, the layout of the system may be simplified, and the manufacturing costs may be reduced, by forming plurality of coolant lines by a single valve 51 according to a selected mode of the vehicle.

According to the heat pump system, in an electric vehicle, the electrical component 10 and the battery module 30 through which the coolant circulates may be interconnected with an air conditioner unit 100 circulating the refrigerant in order to cool and heat the vehicle interior through the chiller 40.

In other words, referring to FIG. 1, the heat pump system may include a first line 11, a second line 12, a third line 13, a fourth line 14, a fifth line 15, a sixth line 16, a seventh line 17, an eighth line 18, a ninth line 19, and a valve module 50.

First, the valve module 50 may control the flow of the interiorly introduced coolant according to at least one selected mode for a temperature adjustment of the vehicle interior and a temperature adjustment of the battery module 30.

A configuration of the valve module 50 is described in more detail below.

In the present embodiment, a first end of the first line 11 may be connected to the valve module 50, and the coolant may selectively flow therethrough. The electrical component 10 may be provided on the first line 11.

A first end of the second line 12 may be connected to a second end of the first line 11. A second end of the second line 12 may be connected to the valve module 50, and the coolant may selectively flow therethrough.

A first radiator 20 may be provided on the second line 12. The first radiator 20 may be disposed in the front of the vehicle, and a cooling fan (not shown) may be provided at a downstream side of the first radiator 20. Accordingly, the first radiator 20 may cool the coolant through an operation of the cooling fan and exchanging heat with an ambient air.

In the present embodiment, a first end of the third line 13 may be connected to the valve module 50 to selectively flow the coolant. The battery module 30 may be provided on the third line 13.

A coolant heater 32 may be provided on the third line 13. For increasing the temperature of the battery module 30, the coolant heater 32 may be operated to heat the coolant supplied to the battery module 30 along the third line 13.

The coolant heater 32 may be an electrical heater operated by a supply of power.

In other words, the coolant heater 32 may be operated when a temperature of the coolant supplied to the battery module 30 is lower than a target temperature, thus heating the coolant flowing via the third line 13.

Accordingly, the coolant whose temperature is increased while passing through the coolant heater 32 may be supplied to the battery module 30 along the third line 13 by an operation of the valve module 50 and may increase the temperature of the battery module 30.

Therefore, the coolant heater 32 may be selectively operated to increase the temperature of the battery module 30.

A first end of the fourth line 14 may be connected to the valve module 50 to selectively flow the coolant. A second end of the fourth line 14 may be connected to a second end of the third line 13.

In the present embodiment, a first end of the fifth line 15 may be connected to the valve module 50 to selectively flow the coolant. The chiller 40 may be provided on a second end of the fifth line 15.

The chiller 40 may be connected to the air conditioner unit 100 via the refrigerant connection line 101. The chiller 40 may be a water-cooled heat-exchanger that exchanges heat between the interiorly introduced coolant with the refrigerant supplied from the air conditioner unit 100.

In other words, the chiller 40 may adjust the temperature of the coolant by exchanging heat between the selectively supplied coolant with the refrigerant selectively supplied from the air conditioner unit 100.

For cooling the battery module 30 by using the coolant having exchanged heat with the refrigerant, or at the time of heating the vehicle interior, the chiller 40 may be operated to recollect heat from the coolant whose temperature is increased by the waste heat of the electrical component 10 or the waste heat of the battery module 30.

In the present embodiment, a first end of the sixth line 16 may be connected to the first line 11 at a location where the first line 11 and the second line 12 are connected. The coolant may selectively flow via the sixth line 16 configured as such according to the operation of the valve module 50.

In addition, a first end of the seventh line 17 may be connected to the third line 13 at a location where the third line 13 and the fourth line 14 are connected. A second end of the seventh line 17 may be connected to the chiller 40.

The coolant may selectively flow via the seventh line 17 configured as such according to the operation of the valve module 50.

In the present embodiment, a first end of the eighth line 18 may be connected to the chiller 40 to selectively circulate the coolant. A second end of the eighth line 18 may be connected to a second end of the sixth line.

In addition, a first end of the ninth line 19 may be connected to the valve module 50 to selectively flow the coolant. A second end of the ninth line 19 may be connected to the eighth line 18 at a location where the sixth line 16 and the eighth line 18 are connected.

A second radiator 25 may be provided on the ninth line 19.

The second radiator 25 may be disposed in a front portion of the vehicle, together with the first radiator 20. The second radiator 25 may cool the coolant through an operation of the cooling fan and exchange heat with an ambient air.

In the present embodiment, the valve module 50 may include the valve 51 configured to control the flow of the interiorly introduced coolant, and at least one water pump provided in the valve 51.

The valve module 50 may further include a first reservoir tank 52 provided in the valve 51 and connected to the second line 12. Additionally, the valve module 50 may include a second reservoir tank 53 provided in the valve 51 and connected to the ninth line 19.

The at least one water pump may include first and second water pumps 54 and 55.

First, the first water pump 54 may be mounted on the valve 51 to correspond to the first line 11.

In addition, the second water pump 55 may be mounted on the valve 51 to correspond to the third line 13.

The first water pump 54 and the second water pump 55 may be disposed at locations facing each other with respect to the valve 51.

In the present embodiment, the valve 51 may selectively discharge the coolant selectively introduced from the second line 12, the fourth line 14, the fifth line 15, or the ninth line 19 via the first line 11 or the third line 13, based on the selected mode among the at least one mode.

The at least one mode may include a first mode to a fifth mode.

First, in the first mode, the electrical component 10 may be cooled by using the coolant cooled at the first radiator 20, and the battery module 30 may be cooled by using the coolant cooled at the second radiator 25.

In the second mode, the electrical component 10 may be cooled by using the coolant cooled at the first radiator 20, and the battery module 30 may be cooled by using the coolant cooled at the chiller 40.

In the third mode, the vehicle interior may be heated, and the waste heat of the electrical component 10 may be recollected.

In the fourth mode, the vehicle interior may be heated, and the waste heat of the battery module 30 may be recollected.

In the fifth mode, the vehicle interior may be heated, and the battery module 30 may be heated while recollecting the waste heat of the electrical component 10.

Hereinafter, an operation and action in each mode of a heat pump system for a vehicle according to an embodiment configured as described above is described in detail with reference to FIGS. 2-6.

First, an operation in the first mode of a heat pump system for a vehicle according to an embodiment, which is for cooling the electrical component 10 by using the coolant cooled at the first radiator 20 and cooling the battery module 30 by using the coolant cooled at the second radiator 25, is described in detail with reference to FIG. 2.

Figure 2:
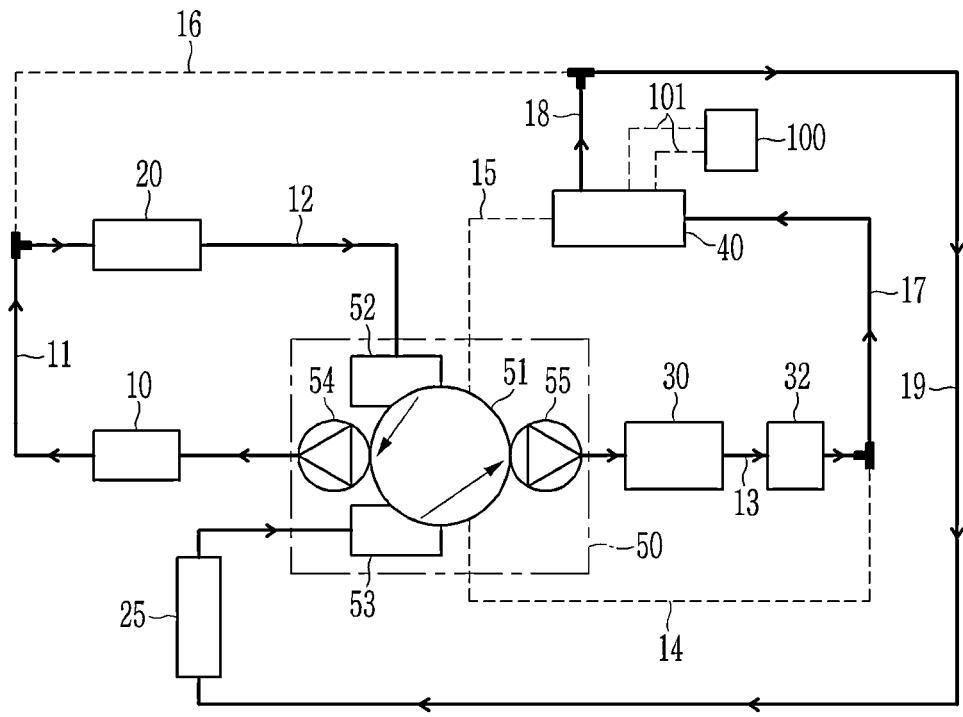
FIG. 2 is an operation diagram according to a first mode of a heat pump system for a vehicle according to an embodiment.

FIG. 2 is an operation diagram according to the first mode of a heat pump system for a vehicle according to an embodiment.

Referring to FIG. 2, in the first mode, the first line 11 may be connected to the second line 12 by an operation of the valve 51 such that the coolant cooled by the first radiator 20 may be supplied to the electrical component 10.

In addition, the ninth line 19 may be connected to the third line 13 by the operation of the valve 51 such that the coolant cooled by the second radiator 25 may be supplied to the battery module 30.

The fourth line 14 and the fifth line 15 may be closed by the operation of the valve 51. At the same time, the sixth line 16 may be closed.

In addition, the seventh line 17 may be opened to be connected to the third line 13 and the chiller 40. The eighth line 18 may be opened to be connected to the ninth line 19 and the chiller 40.

Then, the seventh line 17 and the eighth line 18 may be interconnected through the chiller 40.

Accordingly, the first line 11 and the second line 12 may be interconnected by the operation of the valve 51 to form an independent closed circuit such that the coolant cooled by the first radiator 20 may circulate along the first line 11 and the second line 12.

In addition, the third line 13, the seventh line 17, the eighth line 18, and the ninth line 19 may be interconnected by the operation of the valve 51 to form an independent closed circuit such that the coolant cooled by the second radiator 25 may circulate along the third line 13, the seventh line 17, the eighth line 18, and the ninth line 19.

In such a state, when the first water pump 54 operates, the coolant cooled at the first radiator 20 may be introduced into the valve 51 along the second line 12, and then discharged via the first line 11.

Accordingly, the coolant discharged to the first line 11 may cool the electrical component 10 while passing through the electrical component 10. The coolant having cooled the electrical component 10 may be introduced into the first radiator 20 along the second line 12.

The coolant introduced into the first radiator 20 may be cooled through heat-exchange with the ambient air.

Simultaneously, when the second water pump 55 operates, the coolant cooled at the second radiator 25 may be introduced into the valve 51 along the ninth line 19, and then discharged via the third line 13.

The coolant discharged to the third line 13 may cool the battery module 30 while passing through the battery module 30. The coolant having cooled the battery module 30 may be introduced into the chiller 40 along the seventh line 17. Thereafter, the coolant having passed through the chiller 40 may be introduced into the second radiator 25 along the eighth line 18 and the ninth line 19.

The coolant introduced into the second radiator 25 may be cooled through heat-exchange with the ambient air.

The air conditioner unit 100 may stop operating.

In other words, by repeatedly performing above-described processes, the coolant cooled at the first radiator 20 and the second radiator 25 may cool the electrical component 10 and the battery module 30 to prevent overheating.

In the present embodiment, an operation according to the second mode for cooling the electrical component 10 by using the coolant cooled at the first radiator 20 and cooling the battery module 30 by using the coolant cooled at the chiller 40 is described in detail with reference to FIG. 3.

Figure 3:
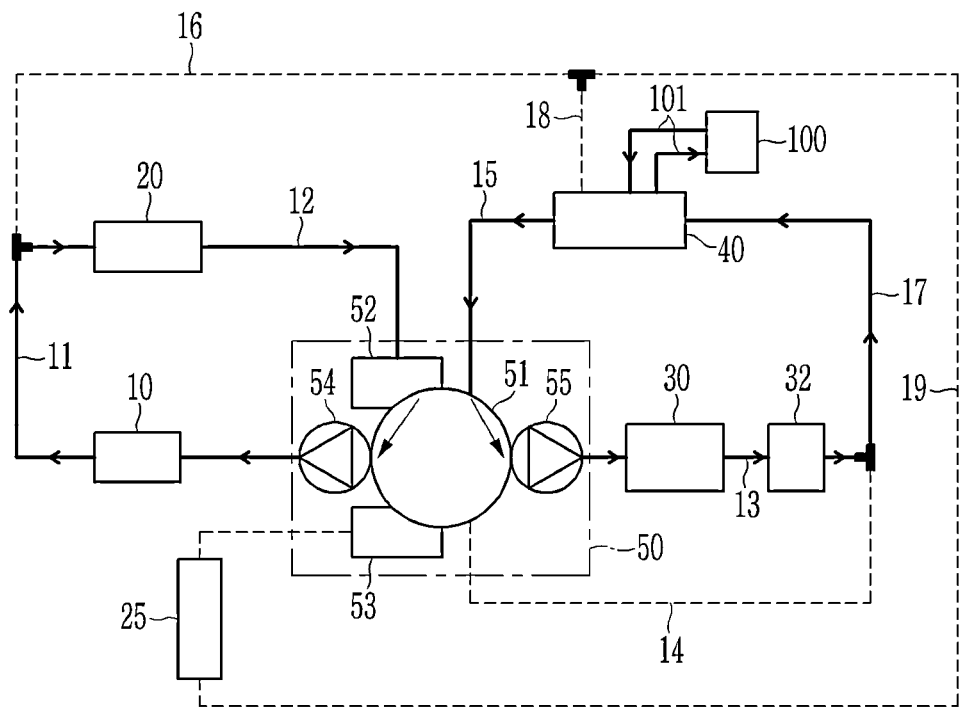
FIG. 3 is an operation diagram according to a second mode of a heat pump system for a vehicle according to an embodiment.

FIG. 3 is an operation diagram according to the second mode of a heat pump system for a vehicle according to an embodiment.

Referring to FIG. 3, in the second mode, the first line 11 may be connected to the second line 12 by the operation of the valve 51 such that the coolant cooled by the first radiator 20 may be supplied to the electrical component 10.

The fifth line 15 may be connected to the third line 13 by the operation of the valve 51. At the same time, the seventh line 17 may be opened to be connected to the third line 13 and the chiller 40.

In addition, the fourth line 14 and the ninth line 19 may be closed by the operation of the valve 51. At this time, the sixth line 16 and the eighth line 18 may be closed.

Accordingly, the first line 11 and the second line 12 may be interconnected by the operation of the valve 51 to form an independent closed circuit such that the coolant cooled by the first radiator 20 may circulate along the first line 11 and the second line 12.

In addition, the third line 13, the fifth line 15, and the seventh line 17 may form an independent closed circuit by the operation of the valve 51.

In such a state, when the first water pump 54 operates, the coolant cooled at the first radiator 20 may be introduced into the valve 51 along the second line 12, and then discharged via the first line 11.

Accordingly, the coolant discharged to the first line 11 may cool the electrical component 10 while passing through the electrical component 10. The coolant having cooled the electrical component 10 may be introduced into the first radiator 20 along the second line 12. The coolant introduced into the first radiator 20 may be cooled through heat-exchange with the ambient air.

Through such operations, the coolant cooled at the first radiator 20 may efficiently cool the electrical component 10.

When the second water pump 55 operates, the coolant discharged to the third line 13 may cool the battery module 30 while passing through the battery module 30.

The coolant having cooled the battery module 30 may flow along the opened seventh line 17. The coolant flowing via the seventh line 17 may pass through the chiller 40, and then may flow along the fifth line 15.

The air conditioner unit 100 may operate such that the refrigerant may be supplied to the chiller 40 via the refrigerant connection line 101. Then, the chiller 40 may cool the coolant while exchanging heat between the refrigerant and the coolant.

The coolant cooled at the chiller 40 may be introduced into the valve 51 along the fifth line 15, and then flow via the third line 13 to be supplied to the battery module 30.

Through such an operation, the coolant cooled by the chiller 40 may be supplied to the battery module 30. In other words, the coolant cooled at the chiller 40 may efficiently cool the battery module 30.

As such, by repeatedly performing the above-described processes, the coolant cooled at the first radiator 20 may efficiently cool the electrical component 10. In addition, the coolant cooled at the chiller 40 through heat-exchange with the refrigerant may efficiently cool the battery module 30.

An operation in the third mode of the heat pump system, which is for heating the vehicle interior and recollecting the waste heat of the electrical component 10, is described in detail with reference to FIG. 4.

Figure 4:
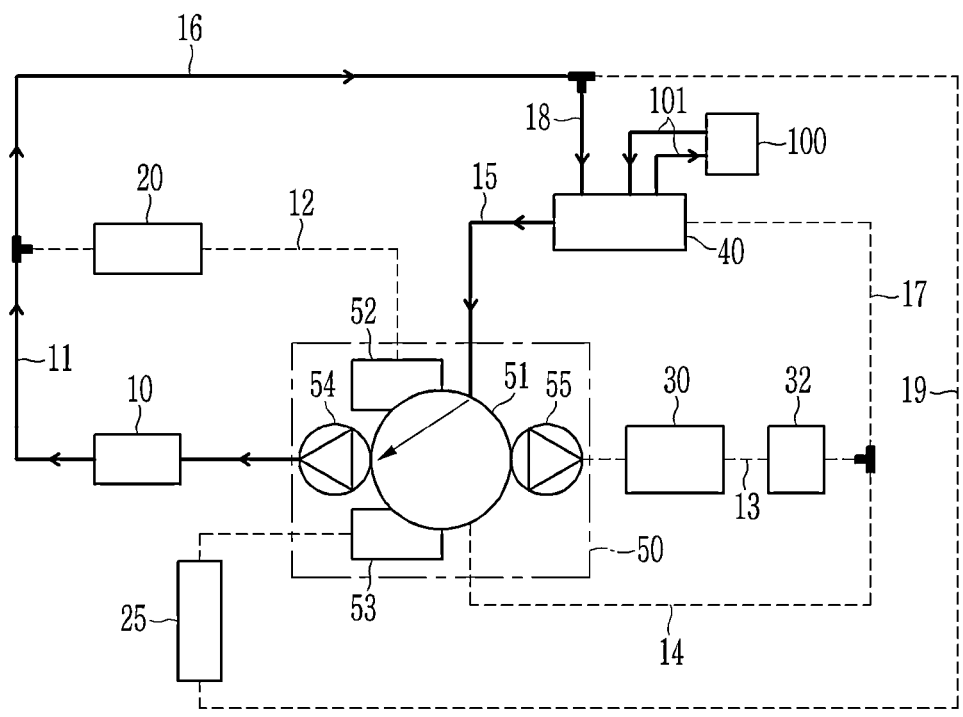
FIG. 4 is an operation diagram according to a third mode of a heat pump system for a vehicle according to an embodiment.

FIG. 4 is an operation diagram according to the third mode of a heat pump system for a vehicle according to an embodiment.

Referring to FIG. 4, in the third mode, the second line 12 may be closed by the operation of the valve 51 such that the coolant having passed through the electrical component 10 may not be supplied to the first radiator 20.

The third line 13, the fourth line 14, and the ninth line 19 may be closed by the operation of the valve 51. Accordingly, an operation of the second water pump 55 is stopped.

The fifth line 15 may be connected to the first line 11 by the operation of the valve 51. The sixth line 16 may be opened to be connected to the first line 11.

In the present embodiment, the seventh line 17 may be closed by the closed third line 13 and the fourth line 14.

In addition, the eighth line 18 may be opened to connect the sixth line 16 and the chiller 40.

Accordingly, the first line 11, the fifth line 15, the sixth line 16, and the eighth line 18 may form an independent closed circuit by the operation of the valve 51.

In such a state, when the first water pump 54 operates, the coolant discharged to the first line 11 may cool the electrical component 10 while passing through the electrical component 10.

The coolant having cooled the electrical component 10 may flow along the opened sixth line 16. The coolant flowing via the sixth line 16 may pass through the chiller 40 connected via the eighth line 18, and then may flow along the opened fifth line 15.

The air conditioner unit 100 may operate such that the refrigerant may be supplied to the chiller 40 via the refrigerant connection line 101.

Then, the chiller 40 may recollect the waste heat of the electrical component 10 from the coolant whose temperature is increased while cooling the electrical component 10.

In more detail, the coolant whose temperature is increased by absorbing the waste heat of the electrical component 10 may increase a temperature of the refrigerant supplied to the chiller 40 while passing through the chiller 40, and then may be recollected.

In other words, the chiller 40 may increase the temperature of the refrigerant by exchanging heat between the coolant and the refrigerant in order to recollect the waste heat from the coolant whose temperature is increased while passing through the electrical component 10. The refrigerant whose temperature is increased may be supplied to the air conditioner unit 100.

As such, by repeatedly performing the above-described processes, the chiller 40 may smoothly recollect the waste heat of the electrical component 10 from the coolant whose temperature is increased while cooling the electrical component 10.

In other words, in the third mode, by absorbing the waste heat of the electrical component 10 at the chiller 40 and using it to increase the temperature of the refrigerant, the power consumption of the compressor provided in the air conditioner unit 100 may be reduced, and the heating efficiency may be improved.

An operation in the fourth mode of the heat pump system, which is for heating the vehicle interior and recollecting the waste heat of the battery module 30, is described in detail with reference to FIG. 5.

Figure 5:
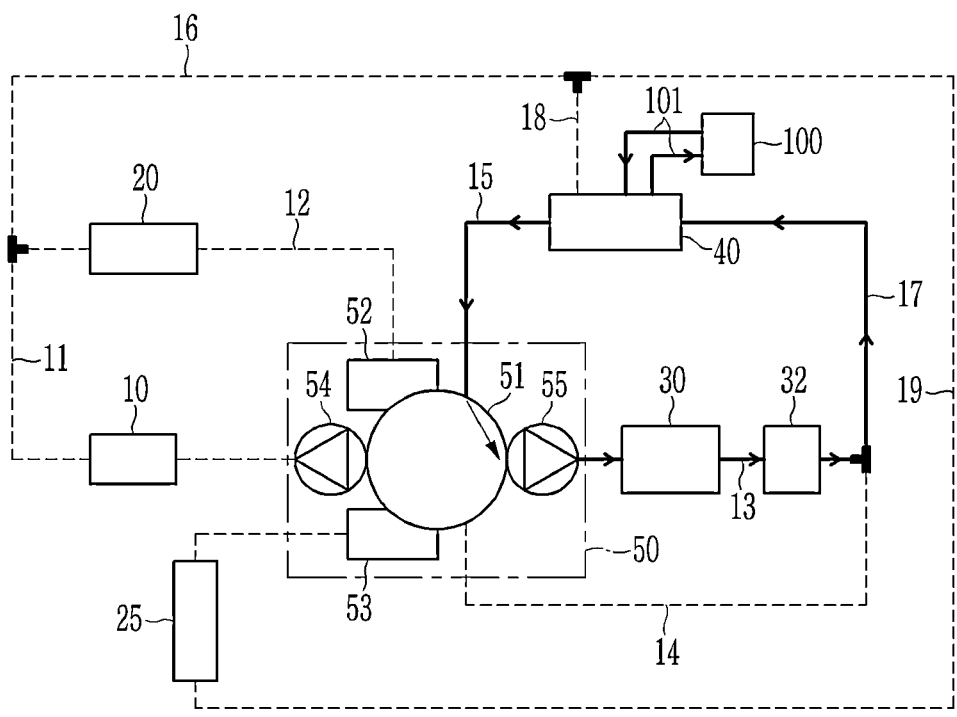
FIG. 5 is an operation diagram according to a fourth mode of a heat pump system for a vehicle according to an embodiment.

FIG. 5 is an operation diagram according to the fourth mode of a heat pump system for a vehicle according to an embodiment.

Referring to FIG. 5, in the fourth mode, the first line 11, the second line 12, the fourth line 14, and the ninth line 19 may be closed by the operation of the valve 51.

An operation of the first water pump 54 may be stopped.

The fifth line 15 may be connected to the third line by the operation of the valve 51. At the same time, the seventh line 17 may be opened to be connected to the third line 13 and the chiller 40.

At this time, the sixth line 16 and the eighth line 18 may be closed.

Accordingly, the third line 13, the fifth line 15, and the seventh line 17 may form an independent closed circuit by the operation of the valve 51.

In such a state, when the second water pump 55 operates, the coolant discharged to the third line 13 may cool the battery module 30 while passing through the battery module 30.

The coolant having cooled the battery module 30 may flow along the opened seventh line 17. The coolant flowing via the seventh line 17 may pass through the chiller 40, and then may flow along the fifth line 15.

The air conditioner unit 100 may operate such that the refrigerant may be supplied to the chiller 40 via the refrigerant connection line 101.

Then, the chiller 40 may recollect the waste heat of the battery module 30 from the coolant whose temperature is increased while cooling the battery module 30 through heat-exchange of the introduced refrigerant and the coolant.

In more detail, the coolant whose temperature is increased by absorbing the waste heat of the battery module 30 may increase the temperature of the refrigerant supplied to the chiller 40 while passing through the chiller 40 and may be recollected.

In other words, the chiller 40 may increase the temperature of the refrigerant by exchanging heat between the coolant and the refrigerant in order to recollect the waste heat from the coolant whose temperature is increased while passing through the battery module 30. The refrigerant whose temperature is increased may be supplied to the air conditioner unit 100.

As such, by repeatedly performing the above-described processes, the chiller 40 may smoothly recollect the waste heat of the battery module 30.

Therefore, in the fourth mode, by absorbing the waste heat of the battery module 30 at the chiller 40 and using it to increase the temperature of the refrigerant, the power consumption of the compressor provided in the air conditioner unit 100 may be reduced, and the heating efficiency may be improved.

In addition, an operation according to the fifth mode of the heat pump system, which is for heating the vehicle interior and heating the battery module 30 while recollecting the waste heat of the electrical component 10, is described in detail with reference to FIG. 6.

Figure 6:
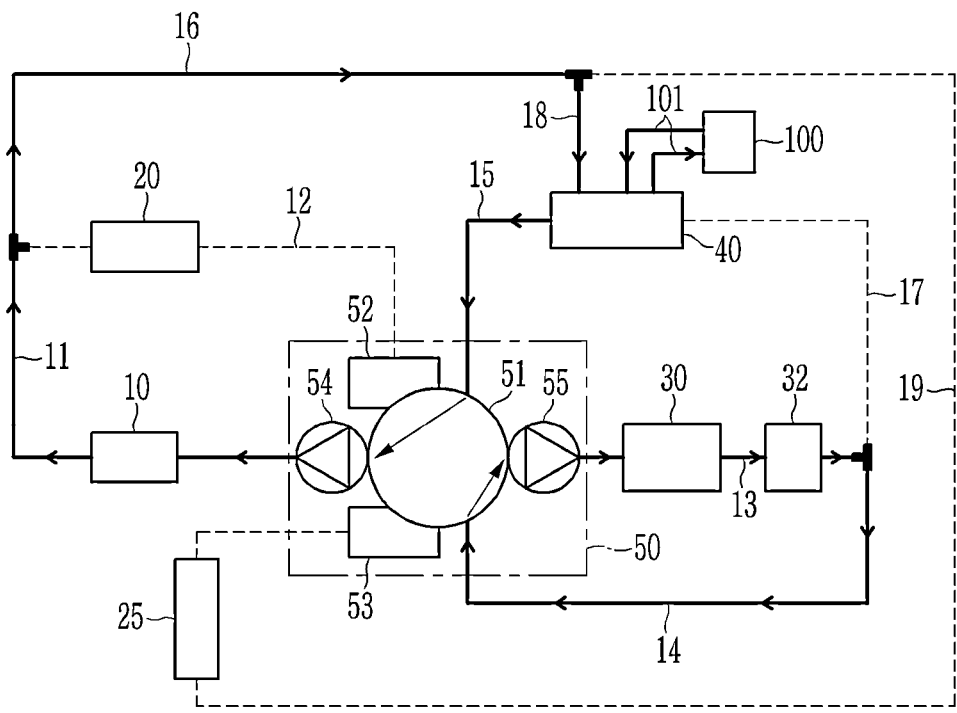
FIG. 6 is an operation diagram according to a fifth mode of a heat pump system for a vehicle according to an embodiment.

FIG. 6 is an operation diagram according to the fifth mode of a heat pump system for a vehicle according to an embodiment.

Referring to FIG. 6, in the fifth mode, the second line 12 may be closed by the operation of the valve 51 such that the coolant having passed through the electrical component 10 may not be supplied to the first radiator 20.

The fourth line 14 may be connected to the third line 13 by the operation of the valve 51.

The fifth line 15 may be connected to the first line 11 by the operation of the valve 51. The sixth line 16 may be opened to be connected to the first line 11.

In addition, the eighth line 18 may be opened to connect the sixth line 16 and the chiller 40.

The seventh line 17 may be closed. In addition, the ninth line 19 may be closed by the operation of the valve 51.

Accordingly, the first line 11, the fifth line 15, the sixth line 16, and the eighth line 18 may form an independent closed circuit by the operation of the valve 51.

In addition, the third line 13 and the fourth line 14 may form an independent closed circuit by the operation of the valve 51.

In such a state, when the first water pump 54 operates, the coolant discharged to the first line 11 may cool the electrical component 10 while passing through the electrical component 10.

The coolant having cooled the electrical component 10 may flow along the opened sixth line 16. The coolant flowing via the sixth line 16 may pass through the chiller 40 connected via the eighth line 18, and then may flow along the opened fifth line 15.

The air conditioner unit 100 may operate such that the refrigerant may be supplied to the chiller 40 via the refrigerant connection line 101.

Then, the chiller 40 may recollect the waste heat of the electrical component 10 from the coolant whose temperature is increased while cooling the electrical component 10.

In more detail, the coolant whose temperature is increased by absorbing the waste heat of the electrical component 10 may increase the temperature of the refrigerant supplied to the chiller 40 while passing through the chiller 40 and may be recollected.

In other words, the chiller 40 may increase the temperature of the refrigerant by exchanging heat between the coolant and the refrigerant in order to recollect the waste heat from the coolant whose temperature is increased while passing through the electrical component 10. The refrigerant whose temperature is increased may be supplied to the air conditioner unit 100.

As such, by repeatedly performing the above-described processes, the chiller 40 may smoothly recollect the waste heat of the electrical component 10 from the coolant whose temperature is increased while cooling the electrical component 10.

In other words, in the fifth mode, by absorbing the waste heat of the electrical component 10 at the chiller 40 and using it to increase the temperature of the refrigerant, the power consumption of the compressor provided in the air conditioner unit 100 may be reduced, and the heating efficiency may be improved.

When the second water pump 55 operates, the coolant discharged to the third line 13 may circulate along the third line 13 and the fourth line 14.

When the battery module 30 is to be heated, the coolant heater 32 may be operated.

The coolant heater 32 may increase the temperature of the coolant circulating along the third line 13 and the fourth line 14 by the operation of the valve 51, and accordingly, the temperature of the battery module 30 may be efficiently increased.

In other words, in the fifth mode, the coolant heater 32 provided on the third line 13 may be selectively operated, and accordingly, the temperature of the battery module 30 may be efficiently adjusted.

Therefore, according to a heat pump system for a vehicle according to an embodiment, the overall efficiency of the system may be enhanced, by adjusting the temperature of the battery module 30 by using the single chiller 40, and by selectively recollecting and using the waste heat of the electrical component 10 and the battery module 30.

In addition, according to the present disclosure, by forming a plurality of coolant flowing lines by a single the valve 51 according to the selected mode of the vehicle, the system may be streamlined and simplified while reducing manufacturing costs.

In addition, according to the present disclosure, by efficiently adjusting the temperature of the battery module 30, the optimal performance of the battery module 30 may be achieved. Additionally, through efficient management of the battery module 30, the overall travel distance of the vehicle may be increased.

In addition, according to an embodiment, it is possible to reduce manufacturing cost and weight through the simplification of an entire system, and thus improve space utilization.

While the technical concepts of this disclosure have been described in connection with what are presently considered to be practical embodiments, it should be understood that the disclosure is not limited to the disclosed embodiments. On the contrary, the disclosure is intended to cover various modifications and equivalent arrangements included within the spirit and scope of the appended claims.

DESCRIPTION OF SYMBOLS

10: electrical component
11, 12, 13: first, second, and third line
14, 15, 16: fourth, fifth, and sixth line
17, 18, 19: seventh, eighth, and ninth line
20: first radiator
25: second radiator
30: battery module
40: chiller
50: valve module
51: valve
52: first reservoir tank
53: second reservoir tank
54: first water pump
55: second water pump

What is claimed is:

1. A heat pump system for a vehicle, the heat pump system comprising:

a valve module configured to control flow of a coolant that is interiorly introduced based on at least one mode for a temperature adjustment of a vehicle interior and a temperature adjustment of a battery module;

a first line connected to the valve module to selectively flow the coolant, and provided with an electrical component;

a second line having a first end connected to the first line and having a second end connected to the valve module to selectively flow the coolant, and provided with a first radiator;

a third line connected to the valve module to selectively flow the coolant, and provided with the battery module;

a fourth line having a first end connected to the valve module to selectively flow the coolant and having a second end connected to the third line;

a fifth line having a first end connected to the valve module to selectively flow the coolant and having a second end provided with a chiller;

a sixth line having a first end connected to the first line at a location where the first line and the second line are connected, and configured to selectively flow the coolant;

a seventh line having a first end connected to the third line at a location where the third line and the fourth line are connected and having a second end connected to the chiller to selectively flow the coolant;

an eighth line having a first end connected to the chiller to selectively flow the coolant and having a second end connected to a second end of the sixth line; and a ninth line having a first end connected to the valve module to selectively flow the coolant and having a second end connected to the eighth line at a location where the sixth line and the eighth line are connected, and provided with a second radiator.

2. The heat pump system of claim 1, wherein the valve module comprises:

a valve configured to control flow of the interiorly introduced coolant; and at least one water pump provided in the valve module.

3. The heat pump system of claim 2, wherein the at least one water pump comprises:

a first water pump mounted in the valve module to correspond to the first line; and a second water pump mounted in the valve module to correspond to the third line.

4. The heat pump system of claim 3, wherein the first water pump and the second water pump are disposed at locations facing each other with respect to the valve.

5. The heat pump system of claim 2, wherein the valve is configured to selectively discharge the coolant selectively introduced from the second line, the fourth line, the fifth line, or the ninth line, via the first line or the third line, based on a selected mode among the at least one mode.

6. The heat pump system of claim 1, wherein the at least one mode comprises:

a first mode for cooling the electrical component by using the coolant cooled at the first radiator and cooling the battery module by using the coolant cooled at the second radiator;

a second mode for cooling the electrical component by using the coolant cooled at the first radiator and cooling the battery module by using the coolant cooled at the chiller;

a third mode for heating the vehicle interior and recollecting waste heat of the electrical component;

a fourth mode for heating the vehicle interior and recollecting the waste heat of the battery module; and a fifth mode for heating the vehicle interior and heating the battery module while recollecting the waste heat of the electrical component.

7. The heat pump system of claim 6, wherein, in the first mode:

the first line is connected to the second line by an operation of the valve module such that the coolant cooled by the first radiator is supplied to the electrical component;

the ninth line is connected to the third line by the operation of the valve module such that the coolant cooled by the second radiator is supplied to the battery module;

the fourth line and the fifth line are closed by the operation of the valve module;

the sixth line is closed;

the seventh line is opened to be connected to the third line and the chiller;

the eighth line is opened to be connected to the ninth line and the chiller;

the seventh line and the eighth line are interconnected through the chiller;

the first line and the second line are interconnected by the operation of the valve module to form an independent closed circuit such that the coolant cooled by the first radiator circulates along the first line and the second line; and the third line, the seventh line, the eighth line, and the ninth line are interconnected by the operation of the valve module to form an independent closed circuit such that the coolant cooled by the second radiator circulates along the third line, the seventh line, the eighth line, and the ninth line.

8. The heat pump system of claim 6, wherein, in the second mode:

the first line is connected to the second line by an operation of the valve module such that the coolant cooled by the first radiator is supplied to the electrical component;

the fifth line is connected to the third line by the operation of the valve module;

the seventh line is opened to be connected to the third line and the chiller;

the fourth line and the ninth line are closed by the operation of the valve module;

the sixth line and the eighth line are closed;

the first line and the second line form an independent closed circuit by the operation of the valve module;

the third line, the fifth line, and the seventh line form an independent closed circuit by the operation of the valve module; and the chiller is configured to cool the coolant through heat-exchange with a refrigerant such that the cooled coolant is supplied to the battery module.

9. The heat pump system of claim 6, wherein, in the third mode:

the second line is closed by an operation of the valve module such that the coolant having passed through the electrical component is not supplied to the first radiator;

the third line, the fourth line, and the ninth line are closed by the operation of the valve module;

the fifth line is connected to the first line by the operation of the valve module;

the sixth line is opened to be connected to the first line;

the seventh line is closed;

the eighth line is opened to connect the sixth line and the chiller;

the first line, the fifth line, the sixth line, and the eighth line form an independent closed circuit by the operation of the valve module; and the chiller is configured to recollect the waste heat of the electrical component from the coolant whose temperature is increased while cooling the electrical component.

10. The heat pump system of claim 6, wherein, in the fourth mode:

the first line, the second line, the fourth line, and the ninth line are closed by an operation of the valve module;

the fifth line is connected to the third line by the operation of the valve module;

the seventh line is opened to be connected to the third line and the chiller;

the sixth line and the eighth line are closed;

the third line, the fifth line, and the seventh line form an independent closed circuit by the operation of the valve module; and the chiller is configured to recollect the waste heat of the battery module from the coolant whose temperature is increased while cooling the battery module.

11. The heat pump system of claim 6, wherein, in the fifth mode:

the second line is closed by an operation of the valve module such that the coolant having passed through the electrical component is not supplied to the first radiator;

the fourth line is connected to the third line by the operation of the valve module;

the fifth line is connected to the first line by the operation of the valve module;

the sixth line is opened to be connected to the first line;

the seventh line is closed;

the eighth line is opened to connect the sixth line and the chiller;

the ninth line is closed by the operation of the valve module;

the first line, the fifth line, the sixth line, and the eighth line form an independent closed circuit by the operation of the valve module;

the third line and the fourth line form an independent closed circuit by the operation of the valve module;

the chiller is configured to recollect the waste heat of the electrical component from the coolant whose temperature is increased while cooling the electrical component; and the battery module is selectively heated by using the coolant flowing along the third line and the fourth line.

12. The heat pump system of claim 2, wherein the valve module further comprises:

a first reservoir tank provided in the valve module and connected to the second line; and a second reservoir tank provided in the valve module and connected to the ninth line.

13. The heat pump system of claim 1, wherein the chiller is connected to an air conditioner unit via a refrigerant connection line.

14. The heat pump system of claim 13, wherein the chiller is a water-cooled heat-exchanger configured to exchange heat between the interiorly introduced coolant and a refrigerant supplied from the air conditioner unit.

15. The heat pump system of claim 1, wherein a coolant heater is provided on the third line.

16. The heat pump system of claim 15, wherein, for increasing a temperature of the battery module, the coolant heater is operated to heat the coolant supplied to the battery module along the third line.

\* \* \* \* \*